(12) United States Patent
Chang et al.

(10) Patent No.: US 9,846,653 B2
(45) Date of Patent: Dec. 19, 2017

(54) PERFORMING WRITE OPERATIONS ON MAIN MEMORY

(71) Applicant: Hewlett Packard Enterprise Development LP, Houston, TX (US)

(72) Inventors: Jichuan Chang, Sunnyvale, CA (US); Doe Hyun Yoon, Palo Alto, CA (US); Robert Schreiber, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/120,357

(22) PCT Filed: Feb. 21, 2014

(86) PCT No.: PCT/US2014/017715
§ 371 (c)(1),
(2) Date: Aug. 19, 2016

(87) PCT Pub. No.: WO2015/126414
PCT Pub. Date: Aug. 27, 2015

(65) Prior Publication Data
US 2017/0068622 A1    Mar. 9, 2017

(51) Int. Cl.
*G06F 12/08* (2016.01)
*G06F 12/0891* (2016.01)
*G06F 12/0862* (2016.01)

(52) U.S. Cl.
CPC ...... *G06F 12/0891* (2013.01); *G06F 12/0862* (2013.01); *G06F 2212/2024* (2013.01); *G06F 2212/60* (2013.01); *G06F 2212/6026* (2013.01)

(58) Field of Classification Search
CPC ............ G06F 12/0804; G06F 12/0862; G06F 12/0891; G06F 12/126; G06F 2212/2024; G06F 2212/60; G06F 2212/6026
(Continued)

(56) References Cited

U.S. PATENT DOCUMENTS 7,624,236 B2    11/2009  Chrysos et al.
2010/0088673 A1   4/2010  Chen et al.
(Continued)

FOREIGN PATENT DOCUMENTS

WO    WO-2013147820    10/2013

OTHER PUBLICATIONS

Wang et al., "Improving Writeback Efficiency with Decoupled Last-Write Prediction", IEEE Apr. 2012, pp. 309-320.*
(Continued)

*Primary Examiner* — Gary Portka
(74) *Attorney, Agent, or Firm* — Lakshmikumaran and Sridharan

(57) ABSTRACT

Write operations on main memory comprise predicting a last write in a dirty cache line. The predicted last write indicates a predicted pattern of the dirty cache line before the dirty cache line is evicted from a cache memory. Further, the predicted pattern is compared with a pattern of original data bits stored in the main memory for identifying changes to be made in the original data bits. Based on the comparison, an optimization operation to be performed on the original data bits is determined. The optimization operation modifies the original data bits based on the predicted pattern of a last write cache line before the last write cache line is evicted from the cache memory.

15 Claims, 5 Drawing Sheets

(58) Field of Classification Search
USPC .......................................... 711/103, 133, 143
See application file for complete search history.

(56) References Cited

U.S. PATENT DOCUMENTS

| | | |
|---|---|---|
| 2010/0124090 A1 | 5/2010 | Arai |
| 2010/0235579 A1 | 9/2010 | Biles et al. |
| 2011/0307663 A1 | 12/2011 | Kultursay et al. |
| 2013/0013860 A1 | 1/2013 | Franceschini et al. |
| 2013/0205089 A1 | 8/2013 | Soerensen et al. |
| 2013/0254488 A1 | 9/2013 | Kaxiras et al. |

OTHER PUBLICATIONS

Jiang, L. et al., Improving Write Operations in MLC Phase Change Memory, (Research Paper), Feb. 25-29, 2012, 2 Pgs.
PCT Search Report/Written Opinion ~ Application No. PCT/US2014/017715 dated Nov. 18, 2014 ~ 10 pages.

\* cited by examiner

PERFORMING WRITE OPERATIONS ON MAIN MEMORY

BACKGROUND

Computing devices usually include a memory device, also referred to as memory, for storing and retrieving information. Memories may store data magnetically or electronically. Recent technologies that have been developed for electronic storage of data are based on phase-change memory (PCM). PCM is a type of non-volatile memory that can retain its data when power is turned off. For data storage, PCM makes use of the large resistance difference between amorphous and crystalline states exhibited by various phase change materials, such as Germanium-Antimony-Tellurium (GST). Generally, the amorphous phase lends to have high electrical resistivity, while the crystalline phase exhibits low resistivity.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1A:
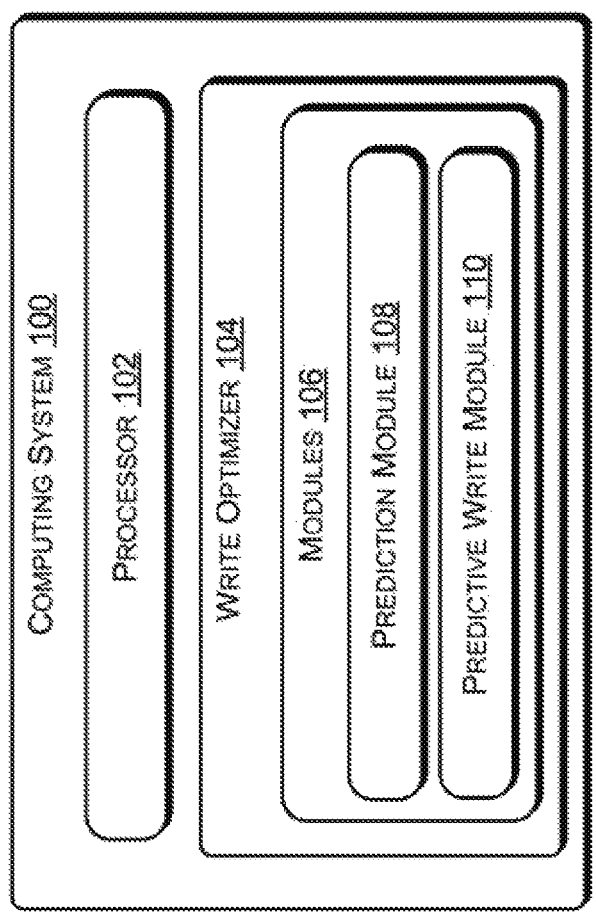
FIG. 1A illustrates an example computing system implementing a write optimizer.

Generally, a memory of a computing system includes a main memory, such as a non-volatile memory (NVM), and a cache memory. The main memory is a physical device that is used to store application programs or data in the computing system. The cache memory stores frequency accessed data so that time may not be spent in accessing the data from the main memory. Typically, data is transferred between the main memory and the cache memory in blocks of fixed size, called cache lines. When a processor of the computing system has to read from or write to a location in the main memory, the processor reacts from or writes to the cache memory if the data is already present in the cache memory, which is much faster than reading from or writing to the main memory. Any data that is written to the cache memory is to be written back to the main memory.

Generally, when a write operation is performed on a cache line, the cache line becomes used and is referred to as a dirty cache line. The dirty cache line stays in a last level cache (LLC) of the cache memory until the dirty cache line is written to the main memory by the processor. As there is no fixed time at which the dirty cache line is written to the main memory, a lot of time may be spent in waiting for eviction of the dirty cache line from the cache memory. Also, write operations are performed after the dirty cache line is evicted from the cache memory. The waiting time may slow down the write operations to the NVM. It should be noted that the NVM may include a phase change memory (PCM), a memristor, a resistive memory, or other such memory.

Write operations in the NVM may include modifying a phase-change material, such as Germanium-Antimony-Tellurium (GST), to either crystalline or amorphous form. The phase change material is referred to as material hereinafter. Typically, there are two kinds of NVM write operations, SET and RESET. The SET operations are used for writing a '1' bit on the NVM. To do so, the SET operations change the phase of the material to a crystalline state. Likewise, the RESET operations are used for writing a '0' bit on the NVM and the RESET operations change the phase of the material to amorphous. As the write operations involve steps to after states of the material used in the NVM the write operations to the NVM are slower and more energy-intensive than reads. The slow write operations increase the read latency, thereby causing performance degradation of the NVM.

In addition, the NVM cell may undergo resistance drift, where a resistance of the NVM cell increases over time. If the resistance of the NVM cell crosses a pre-defined level and reaches another level there may be errors introduced in the stored data. Further, while writing a bit to the NVM cell, the resistance of the NVM cell is checked through an iterative program and verify (P&V) mechanism. Therefore, writing a bit pattern in the NVM cell is usually time consuming and energy intensive. In cases where the dirty cache line is written to the NVM (main memory), the above-described low latency write operation further degrades the performance of the NVM.

According to various examples, systems and methods for performing a write operation in a main memory using a write optimizer are described. The write optimizer helps to reduce write latency in a main memory, such as a non-volatile memory (NVM), when data is written from a cache memory onto the main memory. For this, the write optimizer may utilize a last write predictor (LWP) for predicting a last write in the dirty cache line present in a last level cache (LLC) of the cache memory. The last write refers to a last modification made in the dirty cache line before the dirty cache line is evicted from the cache memory and is written to the main memory, such as the NVM. Thus, the LWP may predict whether a current write is the last write in the dirty cache line. When the current write is predicted to be the last write, the write optimizer determines a predicted pattern of the cache line. The cache line for which the last write is predicted is referred to as a last write cache line.

The write optimizer may compare the predicted pattern of the last write cache line with a pattern of original data bits in the NVM. Based on the comparison, the write optimizer may determine an optimization operation to be performed on the original data bits to modify the original data bits based on the predicted pattern before the last write cache line is written to the NVM. The optimization operation can therefore schedule write operations on the NVM in such a manner that the write latency is reduced.

In an example implementation, the write optimizer may analyze the predicted pattern of the last write cache line to select the optimization operation to be performed on the original data bits. Once selected, the optimization operation may be scheduled on the original data bits before the last write cache line is evicted from the cache memory and written to the main memory. Further, a flag may be associated with the last write cache line to indicate that the optimization operation is scheduled on the original data bits corresponding to the last write cache line. The flag may also indicate which optimization operation is selected by the write optimizer. In an example, the optimization operation can be selected from a pre-WRITE operation, a pre-SET operation, and a pre-RESET operation.

The pre-WRITE operation includes modifying the original data bits as per the predicted pattern of the last write cache line. A pre-WRITE operation may thus be understood as a write operation that is performed proactively before eviction of the last write cache line from the cache memory.

In an example, the optimization operation includes a pre-SET operation. Accordingly, a pre-SET flag is associated with the last write cache line. The pre-SET operation sets the original data bits in the main memory, i.e., writes 1's in the original data bits. Thereafter, the write optimizer may complete the write on the main memory by performing a RESET operation on a small number of data bits in the main memory once the cache line is evicted.

In another example, the optimization operation induces a pre-RESET operation. The pre-RESET operation RESETs the original data bits in the NVM, i.e., writes 0's in the original data bits. Thereafter, the write optimizer may complete the write on the NVM by performing SET operations on a small number of data bits, once the cache line is evicted.

Further, there may be a scenario in which a write operation is performed on the last write cache line after the last write prediction and identification of the predicted pattern by the LWP. In an example implementation, when the cache line is to be evicted from the cache memory, the write optimizer may check whether the predicted pattern is different from an actual pattern of the last write cache line. The actual pattern may be understood as the pattern of the last write cache line when the last write cache line is eventually written to the main memory. If the actual pattern is the same as the predicted pattern and the selected optimization operation is performed on the original data bits, the write optimizer may determine if any further operation has to be performed on the original data bits.

For example, in case of pre-WRITE operations, as the predicted pattern is same as the actual pattern, no additional changes have to be made to the NVM. In case of pre-SET and pre-RESET operations, the write optimizer may write the actual pattern on the NVM by modifying a small number of bits on the NVM. The optimization operation may thus schedule the write operations on the main memory in such a manner that when the last write cache line is evicted from the cache memory, minimal operations are performed on the main memory to write the actual pattern thereon.

If the actual pattern of the last write cache line is different from the predicted pattern, then the write optimizer may convert the modified pattern to write the actual pattern on the main memory. In an example implementation, before writing the actual pattern, the write optimizer may ascertain whether the optimization operation associated with the last write cache line, based on the predicted pattern, is pending or not. If the optimization operation has been performed, the write optimizer may not take into consideration the changes made by the optimization operation and start afresh a write operation for writing the actual pattern on the original data bits. If the optimization operation is yet to be performed and is queued up, the write optimizer may remove the optimization operation from the queue and initiate the write operation. In an example, the optimization operation may be performed in the background as a low priority task. Therefore, the optimization operation may be initiated when there is less demand for the main memory from different applications running on the computing system. As a result, the operation may not affect the processing speed of other tasks.

In an example, the write optimizer may determine a frequency of writes that are made in different regions of the NVM. Based on the determination, the write optimizer may identify frequently accessed regions in the NVM. As the data is accessed frequently from these regions, the data may have a short retention period before it gets modified. The retention period may be understood as an amount of time that a memory cell correctly stores any programmed data value. Therefore, frequent write operations may have to be performed on data having a short retention period, thereby increasing write latency. Therefore, the write optimizer may write the data in these reports at a faster speed that further reduces a retention period of these regions, but also reduces the write latency. The write optimizer may thereby provide an option for trading off the retention time with the write latency of the NVMs.

Accordingly, the write optimizer can enhance performance of the NVM by utilizing last write predictions while writing on the NVM. Such write operations facilitate in reducing the write latency of the NVM. Further, the write optimizer can efficiently utilize a charge capacity of the NVM by performing optimization operations selectively on the original data bits for writing the actual pattern of the dirty cache line in the NVM.

The various systems and the methods are further described in conjunction with the figures and associated description below. It should be noted that the description and figures merely illustrate the principles of the present subject matter. Further, various arrangements may be devised that, although not explicitly described or shown herein, embody the principles of the present subject matter and are included within its scope.

While aspects of described systems and methods for performing a write operation on a main memory can be implemented in any number of different computing systems, environments, and/or implementations, the examples and implementations are described in the context of the following system(s).

FIG. 1A illustrates the components of a computing system 100, according to an example of the present subject matter. In an example, the computing system 100 may be implemented as any computing system, such as a desktop, a laptop, a mailing server, a smart phone, a tablet, and the like. While the computing system 100 is shown as a stand-alone system, in an example, the computing system 100 can be implemented in a network environment comprising a variety of network devices, including routers, bridges, servers, computing devices, storage devices, etc.

In an example implementation, the computing system 100 includes a processor 102 and a write optimizer 104 communicatively coupled to the processor 102. As generally described herein, the term "communicatively coupled" refers to two entities that exchange data signals with one another, such as, for example, electrical, electromagnetic, and optical signals, among others. The coupling may be a direct connection or over a network.

In an example, the write optimizer 104 may include modules 106. The modules 106, amongst other things, include routines, programs, objects, components, and data structures, which perform particular tasks or implement particular abstract data types. The modules 106 may also be implemented as, signal processor(s), state machine(s), logic circuitries, and/or any other device or component that manipulate signals based on operational instructions. Further, the modules 106 can be implemented by hardware, by computer-readable instructions executed by a processing unit, or by a combination thereof. In an example implementation, the modules 106 include a prediction module 108 and a predictive write module 110.

In an example, the prediction module 108 may identify at least one write operation performed on a cache line. A cache line may be understood as a block of data that can be transferred between a main memory, such as a non-volatile memory (NVM), and a cache memory of a computing system 100. The cache memory includes a pre-defined number of cache lines. Further, each cache line typically contains 512 data bits. When a write operation is performed on the cache line, the pattern of the cache line changes and the cache line is said to become dirty. The prediction module 108 may identify the dirty cache line once the write operation is performed on the cache line. Further, the prediction module 108 can predict whether the write operation is a last write or not. The fast write indicates that the dirty cache line will not be written again before the dirty cache line is evicted from the cache memory, for example, due to a file save command provided by a user or an application. The prediction module 108 may employ a last write predictor (LWP) to predict the last write in the dirty cache line. The cache line for which the last write is predicted may be referred to as a last write cache line. Based on the prediction, the prediction module 108 may obtain a predicted pattern of the last write cache line.

Typically, when the last write is completed in the cache memory, the dirty cache line is written to the NVM. In an example, as the dirty cache line present in a last level cache (LLC) may be considered first to be written to the NVM, the prediction module 108 predicts the last write for the last write cache line in the LLC. Further, the predictive write module 110 may compare the predicted pattern of the last write cache line with a pattern of original data bits stored on the NVM. Based on the comparison, the predictive write module 110 may identify changes to be made in the original data bits.

In an example, the predictive write module 110 may analyze the changes to be made in the original data bits to select an optimization operation to be performed on the original data bits. The optimization operation may facilitate in modifying the original data bits as per the predicted pattern of the last write cache line. In an example, the optimization operation may be selected from a pre-WRITE operation, a pre-SET operation, and a pre-RESET operation. The pre-WRITE operation modifies the original data bits based on the predicted pattern of the last write cache line. On the other hand, the pre-SET operation converts the original data bits into 1's such that once an actual pattern of the last write cache line is obtained, a RESET operation may be selectively performed on some of the SET data bits to write the actual pattern on the NVM. The actual pattern may be understood as the pattern of the data bits when the last write cache line is eventually written to the main memory.

In another example, during the pre-RESET operation, the predictive write module 110 converts the original data bits into 0's and thereafter selectively performs a SET operation on the RESET data bits, based on the predicted pattern. Further, the predictive write module 110 may associate a flag with the last write cache line to indicate that an optimization operation is initiated for the original data bits corresponding to the last write cache line. The flag also indicates which optimization operation is selected by the predictive write module 110 to be performed on the main memory 154. In an example, the optimization operation is performed in the background as a low priority operation. Therefore, the predictive write module 110 may schedule the optimization operation to be performed when the demand for the NVM is low.

Figure 1B:
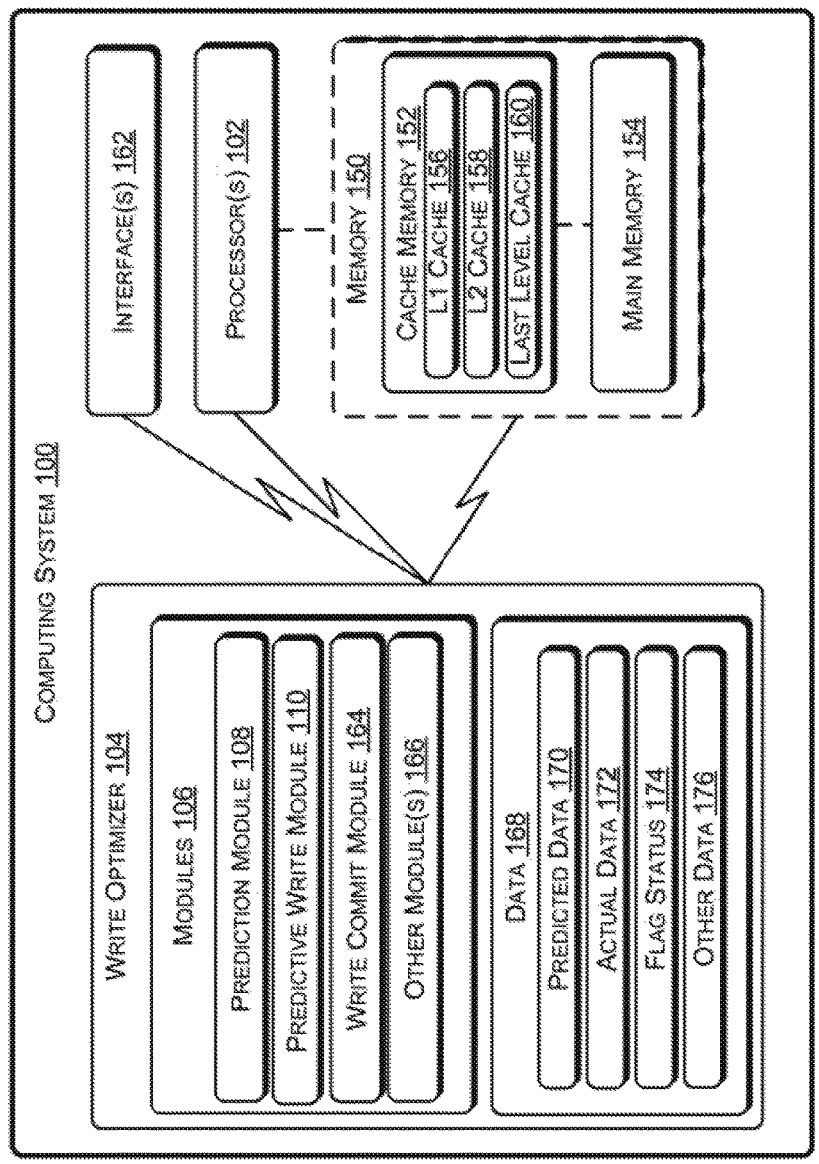
FIG. 1B illustrates an example implementation of the write optimizer in the computing system.

FIG. 1B illustrates the computing system 100 including the write optimizer 104 according to another example implementation. The computing system 100 may be implemented on a stand-alone computing system or a network interfaced computing system. For example, the computing system 100 can include a memory 150 communicatively coupled to the processor 102.

The memory 150 can include any non-transitory computer-readable medium known in the art including, for example, a volatile memory, such as static random access memory (SRAM) and dynamic random access memory (DRAM), and/or a non-volatile memory, such as read only memory (ROM), erasable programmable ROM, flash memories, hard disks, optical disks, and magnetic tapes. Accordingly, the memory 150 includes a cache memory 152 and a main memory 154. The cache memory 152 is a high speed memory located between the processor 102 and the main memory 154. The cache memory 152 is typically organized as a hierarchy of multiple cache levels, such as L1 cache 156, L2 cache 158, and a last level cache (LLC) 160.

Further, the computing system 100 includes interface (s) 162. The interfaces 162 may include a variety of interfaces, for example, interfaces for user device(s), storage devices, and network devices. The user device(s) may include data input and output devices, referred to as I/O devices. The interface(s) 162 facilitate the communication of the computing system 100 with various communication and computing devices and various communication networks, such as networks that use a variety of protocols, for example, Hypertext Transfer Protocol (HTTP) and Transmission Control Protocol/Internet Protocol (TCP/IP).

As mentioned earlier, the communication system 100 includes the write optimizer 104. Further, the modules 106 include the prediction module 108, the predictive write module 110, a write commit module 164, and other module(s) 166. The other module(s) 166 may include programs or coded instructions that supplement applications or functions performed by the write optimizer 104. The modules may be implemented as described in relation to FIGS. 1A and 1B.

In an example, the write optimizer 104 includes data 168. The data 168 may include predicted data 170, actual data 172, flag status 174, and other data 176. The other data 178 may include data generated and saved by the modules 106 for implementing various functionalities of the write optimizer 104. Although the data 168 is shown internal to the write optimizer 104, it may be understood that the data 168 can reside in the memory 150, which is coupled to the processor 102.

Typically, different applications access data residing on the main memory 154 of the computing system 100. When the data is accessed for performing an operation, such as a read or a write, a copy of the data is created in the cache memory 152. For example, the data may be transferred between the main memory 154 and the cache memory 152 in blocks of fixed size, called cache lines. When the processor 102 of the computing system 100 has to write to a location m the main memory 154, the processor 102 makes changes in the cache lines. When a change is made to a cache line, the cache line becomes used and is referred to as a dirty cache line. Once the write operation is completed, the duty cache line is evicted from the cache memory 152, i.e., the dirty cache line is written to the main memory 154.

To reduce latency of write operations in the NVM, the prediction module 108 may identify a dirty cache line in the cache memory 152 in which a modification is made by the processor 102. In case of multiple cache levels, the prediction module 108 may identify the dirty cache line in the LLC 160 as that dirty cache line is written to the main memory 154 first. Further, the prediction module 108 may predict a last write made to the dirty cache line in the LLC 160. The last write indicates that the dirty cache line will not be written again before being evicted from the cache memory 152.

To predict the fast write in the dirty cache line of the LLC 160, the prediction module 108 may employ a last write predictor (LWP). In an example, the LWP is a program counter (PC) based predictor that predicts the last write based on a reasoning that if an instruction PC leads to the last write access to one cache line, then there is a high probability that the next time the instruction is reached, the instructions will lead to a last-write in the cache line. The prediction module 108 may employ different methods for predicting the last write in a cache line. In an example, the LWP includes a LLC write simulator and a prediction table. Once the dirty cache line accesses the LLC 160, the LWP consults the prediction table to make a prediction.

In an example implementation, the prediction table includes at least three tables, each indexed by a different hash of 16-bits partial PC. Once a dirty cache line accesses the LLC 160, the prediction module 108 may use the LWP to predict whether or not a change made to the dirty cache line is the last-write. The prediction is based on a sum of the counter values for all the three tables that are indexed by different hashes of the PC related to the dirty cache line. For example, if the sum of the counter values for all three tables is greater than a threshold, then the write is considered as the last-write. Further, the LLC write simulator simulates the write behavior of the LLC 160 and updates the prediction table.

In an example, a set of dirty cache lines is selected by the LWP as a sample from the LLC 160. Each entry in the set induces a partial tag field, a partial write PC field, a valid bit, and a least recently used (LRU) field. When a write operation access the sampled set of dirty cache lines, the write operation also accesses the LLC write simulator simultaneously. The corresponding sampled set is searched for an entry with a matching tag. If there is a miss in the LLC write simulator, i.e., the corresponding data bit is not available in the LLC write simulator, an entry is allocated in the LLC write simulator using a LRU policy. In an example implementation, the prediction module 108 uses the LRU replacement policy. However, the prediction module 108 can also simulate the last write behavior for the LLC 160 using other replacement policies. The dirty cache line in the LLC 160 for which the last write is predicted by the prediction module 108 may be referred to as a last write cache line.

Furthermore, as each cache line corresponds to a pattern of data bits, the prediction module 108 may identify the pattern of the last write cache line. A pattern of data bits of the last write cache line is hereinafter referred to as a predicted pattern. The prediction module 108 may store prediction related data, such as the last write and the predicted pattern as the predicted data 170. In an example implementation, the prediction module 108 may also determine frequency of writes that are made to different regions of the main memory 154. Based on the determination, the prediction module 108 may identify frequently accessed regions in the main memory 150.

Further once the predicted pattern of the last write cache line is identified, the predictive write module 110 may compare the predicted pattern with a pattern of original data bits on the main memory 154. Based on the comparison, the predictive write module 110 identifies the changes to be made in the original data bus to make the pattern of the original data bits as per the predicted pattern of the last write cache line. The predictive write module 110 may further analyze the changes identified after the comparison, to select an optimization operation to be applied on the original data bits for modifying the original data bits as per the predicted pattern. In an example implementation, the predictive write module 110 may initiate the selected optimization operation in the background, even before the last write cache line is written to the main memory 154.

As the original data bits reside on the main memory 154, such as the NVM, the predictive write module 110 may analyze the changes to be made in the original data bits to select the optimization operation that reduces write latency of the NVM. In addition, as NVM cells have a certain amount of current, the predictive write module 110, based on the analysis, may select that optimization operation for writing to the NVM which consumes less current. In an example implementation, the optimization operation includes a pre-WRITE operation, a pre-SET operation, and a pre-RESET operation. Further, the predictive write module 110 may associate a flag with the last write cache line to indicate that an optimization operation is scheduled to be performed on the original data bits corresponding to the last write cache line.

In an example, consider a 4 bit cache line having the original data bits on the NVM as '0001' and the predicted pattern of the last write cache line as '0101'. The predictive write module 110 may initiate the pre-WRITE operation proactively in the background. A pre-WRITE operation may be understood as a WRITE operation that is performed proactively before eviction of the last write cache line from the cache memory 152. In other words, the pre-WRITE operation includes writing exact data bits of the predicted pattern of the last write cache line on the main memory 154 before eviction of the last write cache line from the cache memory 152. Typically, a cache line induces 512 data bits and therefore when it is identified that the modifications in the original data bits based on the predicted pattern of the last write cache line includes almost the same number of SET and RESET operations, the predictive write module 110 may initiate the pre-WRITE operation to be performed on the original data bits of the main memory 154.

Further, the pre-WRITE operation may include partial writes to the original data bits in the main memory 154. In an example implementation, the partial writes may be understood as a write operation that updates the main memory 154 with a subset of bits. For example, the predictive write module 110 may associate a word-level bitmap flag with the last write cache line in the LLC 160. The bitmap flag indicates a status of data bits in the last write cache line, i.e., the bitmap flag indicates whether or not the data bits of the last write cache line have been written to the main memory 154. For example, the predictive write module 110 may associate a flag, such as a '0' bit, with each data bit of the last write cache line before the predicted pattern is written to the main memory 154. When the predictive write module 110 may write the predicted pattern of the last write cache line to the main memory 154, the flag may be changed to say, a '1' bit. The change in the flag indicates that the bits are written to the main memory 154. In case any modification is made on the dirty cache line in the LLC 160 after the last write prediction, the predictive write module 110 may again make the flag as '0' for specifically those bits that have been changed. Accordingly, the bitmap flags facilitate in identifying which bits are already written to the main memory 154.

In another example, the modifications to be done on the original data bits based on the comparison between the predicted pattern of the last write cache line and the pattern of the original data bits, may include an additional number of SET operations, i.e., the predicted pattern may include more 1's than 0's. In this case, the predictive write module 110 may select the pre-SET operation to be performed on the original data bits of the main memory 154. Accordingly, the predictive write module 110 associates a pre-SET flag with the last write cache line to indicate that the pre-SET operation is initiated for the original data bits corresponding to the last write cache line. The pre-SET operation SETs the original data bits in the main memory 154 in advance based on the predicted pattern in the fast write cache line of the LLC 160. For example, the pre-SET operation will change the original data bits from '0010' to '1111', as soon as the last write is predicted by the prediction module 108 for the last write cache line in the LLC 160.

Further, consider a scenario when the number of RESET operations to be performed on the original data bits is high as compared to the SET operations. In such a scenario, the predictive write module 110 may select a pre-RESET operation to be performed on the original data bits corresponding to the last write cache line. The predictive write module 110 may associate a pre-RESET flag with the last write cache line to indicate that the pre-RESET operation is initiated for the original data bits corresponding to the last write cache line. The pre-RESET operation RESETs the original data bits in the main memory 154 when the last write is predicted for the dirty cache line in the LLC 160. For example, the pre-RESET operation will change the original data bits from '0010' to '0000', as soon as the last write is predicted by the prediction module 108 for the dirty cache line.

In an example, the optimization operation, such as pre-WRITE, pre-SET, and pre-RESET, is performed in the background and is therefore scheduled when demand of the main memory 154 is low. Further, the optimization operation can be scheduled at any point in time when the last write is predicted for the dirty cache line and a time when the last write cache line is actually written to the main memory 154. The optimization operation proactively changes the original data bits as per the predicted pattern thereby saving time and facilitating in reducing write latency of the main memory 154, such as NVM.

In an example implementation, the last write cache line from the LLC 160 eventually gets evicted and is written to the main memory 154. Before writing the actual pattern of the last write cache line on the main memory 154, the write commit module 164 may check a status of the optimization operation indicated by the flag associated with the last write cache line. The write commit module 164 may determine if the optimization operation associated with the flag is performed on the original data bits or not. In an example, if the actual pattern is the same as the predicted pattern and the pre-WRITE operation associated with the last write cache line is performed, the write commit module 164 does not take any action on the original data bits. In case the pre-WRITE operation is pending and is not yet performed, the write commit module 164 may remove the pre-WRITE flag from the last write cache line and hence the pre-WRITE operation associated with the last write cache line is also removed. The write commit module 184 may then perform a write operation on the main memory 154 to write the actual pattern on the original data bits. The write commit module 164 may store information related to the actual pattern and the flags as the actual data 172 and the flag status 174.

In case the pre-SET operation is selected by the predictive write module 110 and the actual pattern is the same as the predicted pattern, the write commit module 164 may check the status of the pre-SET operation as the pre-SET flag is associated with the last write cache line. If the pre-SET operation is performed on the original data bits, the write commit module 164 may perform low latency RESET operations on selective data bits to write the actual pattern of the last write cache line to the main memory 154. The pre-SET operations thereby incur less storage overhead. In case the pre-SET operation is pending and is not yet performed, the write commit module 164 may remove the pre-SET operation being performed on the original data bits and perform a write operation on the main memory 154 to write the actual pattern on the original data bits.

In a scenario where the pre-RESET operation is selected by the predictive write module 110 and the actual pattern is the same as the predicted pattern, the write commit module 164 may check the status of the pre-RESET operation associated with the last write cache line. If the pre-RESET operation is performed on the original data bits, the write commit module 164 may perform low current SET operations on selective data bits to write the actual pattern of the last write cache line in the main memory 154. In case the pre-RESET operation is pending and is not yet performed, the write commit module 164 may remove the pre-RESET operation being performed on the original data bits and perform a write operation on the main memory 154 to write the actual pattern on the original data bits.

On the other hand, in an example implementation, the actual pattern may be different from the predicted pattern, i.e., a write is performed after the last write is predicted for the dirty cache line in the LLC 160. In case of the pre-WRITE operation, the write commit module 164 does not take into consideration the pre-WRITE operation performed on the original data bits as per the predicted pattern of the last write cache line. For example, the write commit module 164 may write over the predicted pattern as written by the predictive write module 110. Accordingly, the write commit module 164 may perform a write operation on the original data bits based on the actual pattern of the fast write cache line.

In case of partial writes, the write commit module 164 may identify the bitmap flag of the changed bits in the last write cache line indicating that these bits are new and are yet to be written to the main memory 154. After the last write cache line is evicted from the cache memory 152, the write commit module 164 may write the changed bits on the main memory 154. Further, in case of the pre-SET and pre-RESET operations, the write commit module 164 may selectively perform the corresponding operation, such as SET and RESET, on some of the original data bits to change the pattern of the original data bits as per the actual pattern of the last write cache line.

Further, as the data stored in the frequently accessed regions, determined by the prediction module 108, has a short retention period, the write commit module 164 may write the date in these regions at a faster speed thereby reducing the retention period of these regions. The write commit module 164 may therefore provide an option for trading off the retention time with the write latency by identifying the frequently accessed regions of the main memory 154.

In an example implementation, the above described prediction and optimization operations may be used for optimizing write operations on the NVMs with different levels of cells, such as single level cells (SLC) and multi-level cells (MLC) including three level cells (3LC) or any non-power-of-2-level cells. In case of MLC NVM, the resistance, especially in intermediate levels, may cross a specified boundary and cause errors. To keep a check on the resistance of each level in the MLC, the iterative P&V technique may be applied. As the P&V technique is time consuming, the latency of the write operations in the MLC NVM is high.

The write optimizer 104 may optimize the write operations for the MLC NVM, such as 3LC, to be equivalent to the write operations in the SLC. In case of a 3LC write, the write commit module 164 may perform long SET operations at an L0 state of the 3LC. Further, at an L3 state of the 3LC, the write commit module 164 may perform the RESET operation on the original data bits in the NVM. In case of L1 and other intermediate states, the write commit module 164 may perform the RESET operation followed by a program and verify (P&V) stage. The P&V stage includes short SET operations that are followed by read operations to verify the SET operations. Further, the write commit module 164 may perform moderate quenching (MQ) for the intermediate states. The MQ may be understood as application of a current pulse to the main memory 154 that eventually reduces in strength. The write commit module 164 may perform the MQ along with the short SET operations to optimize the write operations in 3LC NVM.

Accordingly, the computing system 100 employs the write optimizer 104 that utilizes last write predictions while writing on the NVM to enhance the performance of the NVM. The write optimizer 104 may identify frequently accessed regions in the NVM based on which different write operations are performed on those regions to efficiently utilize a small amount of current of the NVM. The write optimizer 104 proactively initiates the operations to be performed on the main memory 154 before the last write cache line is evicted from the cache memory 152. Such initiation of the operations facilitate in reducing the write latency of the NVM.

Figure 2A:
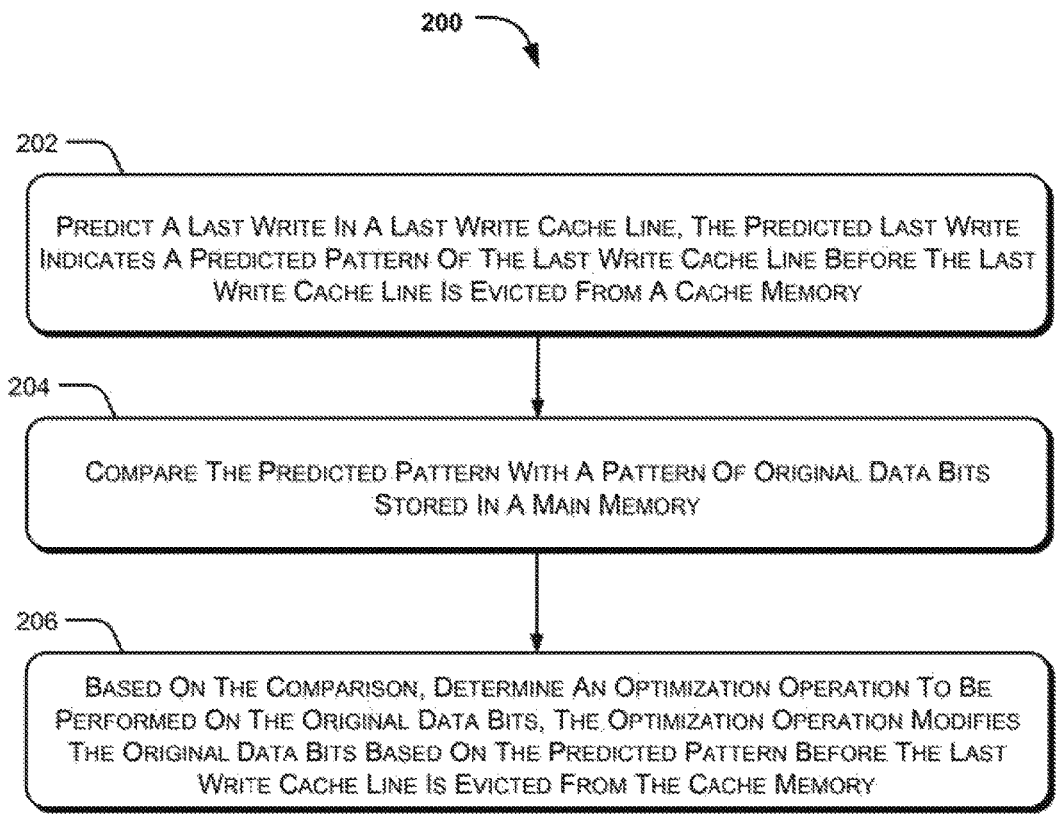
FIG. 2A is a flowchart for performing a write operation on a main memory, according to various examples.
Figure 2B:
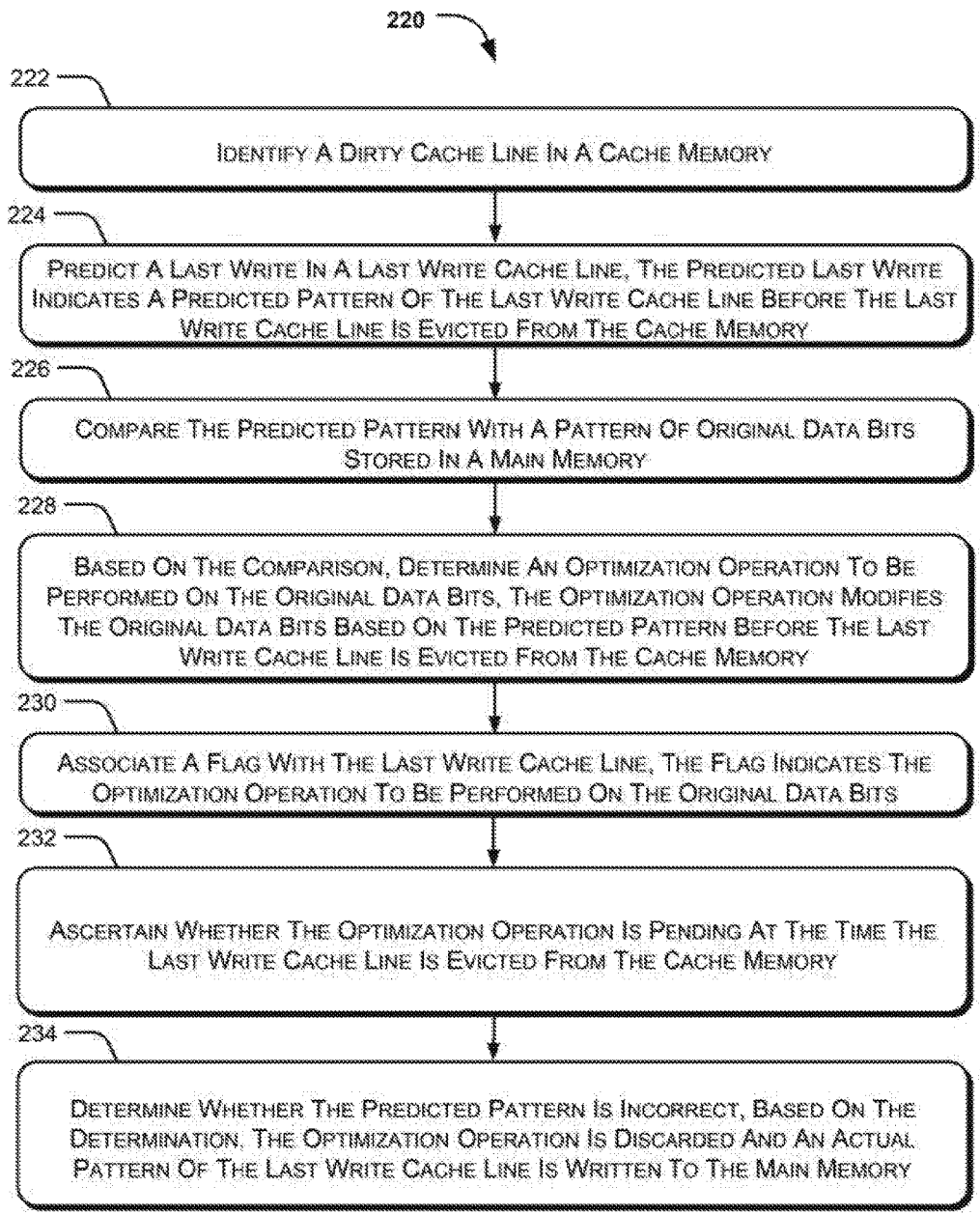
FIG. 2B is a flowchart for performing the write operation on the main memory.

FIGS. 2A and 2B illustrate example flowcharts for writing data on a main memory 154. The order in which methods 200 and 220 are described is not intended to be construed as a limitation, and some of the described method blocks can be combined in a different order to implement the methods 200 and 220, or an alternative method. Additionally, individual blocks may be deleted from the methods 200 and 220 without departing from the spirit and scope of the subject matter described herein. Furthermore, the methods 200 and 220 may be implemented in any suitable hardware, computer-readable instructions, or combination thereof.

The steps of the methods 200 and 220 may be performed by either a computing device under the instruction of machine executable instructions stored on a computer readable medium or by dedicated hardware circuits, microcontrollers, or logic circuits. Herein, some examples are also intended to cover a computer readable medium, for example, digital data storage media, which are machine or computer readable and encode machine-executable or computer-executable instructions, where said instructions perform some or all of the steps of the described methods 200 and 220.

With reference to method 200 as depicted in FIG. 2A, at block 202, the method 200 includes predicting a last write in a dirty cache line. In an example implementation, the prediction module 108 may predict the last write in the dirty cache line. The predicted last write includes a predicted pattern of the last write cache line before the dirty cache line is evicted from the cache memory 152. Further, the predicted last write indicates that the dirty cache line will not be written again before being evicted from a last level cache (LLC) 160. The prediction module 108 may employ a last write predictor to predict the last write in the dirty cache line.

As depicted in block 204, the method 200 induces comparing the predicted pattern of the last write cache line with a pattern of original data bits stored in the main memory 154, such as a non-volatile memory (NVM). In an example implementation, the predictive write module 110 may compare the predicted pattern of the last write cache line with the pattern of the original data bits to identify the changes to be made in the original data bits in the main memory 154.

As shown in block 206, the method 200 includes determining an optimization operation to be performed on the original data bits, based on the comparison. In an example implementation, the predictive write module 110 may determine the optimization operation for modifying the original data bits based on the predicted pattern of the last write cache line before the last write cache line is evicted from the cache memory 152. The optimization operation may be selected from a pre-WRITE operation, a pre-SET operation, or a pre-RESET operation.

With reference to FIG. 2B, at block 222, the method 220 includes identifying a dirty cache line in the cache memory 152. In an example implementation, the prediction module 108 may identify the dirty cache line when at least one modification is made to a cache line.

As depicted in block 224, the method 220 includes predicting a last write in the dirty cache line. In an example, the prediction module 108 may employ a last write predictor (LWP) to predict the last write in the dirty cache line. The last write indicates that the dirty cache line will not be written again before being evicted from the cache memory 152 of the computing system 100. In an example, the prediction module 108 may predict the last line in the dirty cache line of a last level cache (LLC) 160 of the cache memory 152. Further, the last write indicates a predicted pattern of the dirty cache line before the dirty cache line is evicted from the cache memory 152. The dirty cache line for which the last write is predicted is referred to as a last write cache line.

As shown in block 226, the method 220 includes comparing the predicted pattern of the last write cache line with a pattern of original data bits stored in the main memory 154. In an example, the predictive write module 110 may compare the predicted pattern with the pattern of the original data bits. The predictive write module 110 may identify changes to be made in the original data bits to write the predicted pattern on the main memory 154.

As illustrated in block 228, the method 220 includes determining, based on the comparison, an optimization operation to be performed on the original data bits. In an example implementation, the predictive write module 110 may determine the operation based on the changes to be made to the original data bits. The optimization operation modifies the original data bits based on the predicted pattern of the last write cache line before the last write cache line is evicted from the cache memory 152. For example, the optimization operation includes a pre-WRITE operation, a pre-SET operation, and a pre-RESET operation.

Further, at block 230, the method 220 includes associating a flag with the last write cache line. In an example, the predictive write module 110 may associate the flag with the last write cache line to indicate that an optimization operation is scheduled to be performed on the original data bits corresponding to the last write cache line.

As shown in block 232, the method 220 includes ascertaining whether the optimization operation associated with the last write cache line is performed on the original data bits when the last write cache line is evicted from the cache memory 152. For example, the last write cache line will eventually be written to the main memory 154 and will be evicted from the cache memory 152. The write commit module 164 may check if any optimization operation is associated with the last write cache line or not. It the optimization operation is associated with the last write cache line and is pending at the time of eviction of the last write cache line, the write commit module 164 may discard the operation and perform a write operation, based on the actual pattern, on the main memory 154. In an example implementation, the write commit module 164 may change the type of operation in the flag, as defined by the predictive write module 110, associated with the last write cache line.

As depicted in block 234, the method 220 includes determining whether or not the last written pattern is incorrect. In an example implementation, the write commit module 164 may compare the predicted pattern with an actual pattern of the last write cache line when the last write cache line is evicted from the cache memory 152, to determine whether the predicted pattern is incorrect. For example, if the predicted pattern is different from the actual pattern, the write commit module 164 may discard the optimization operation performed on the original data bits and writes the actual pattern of the last write cache line to the main memory 154.

Figure 3:
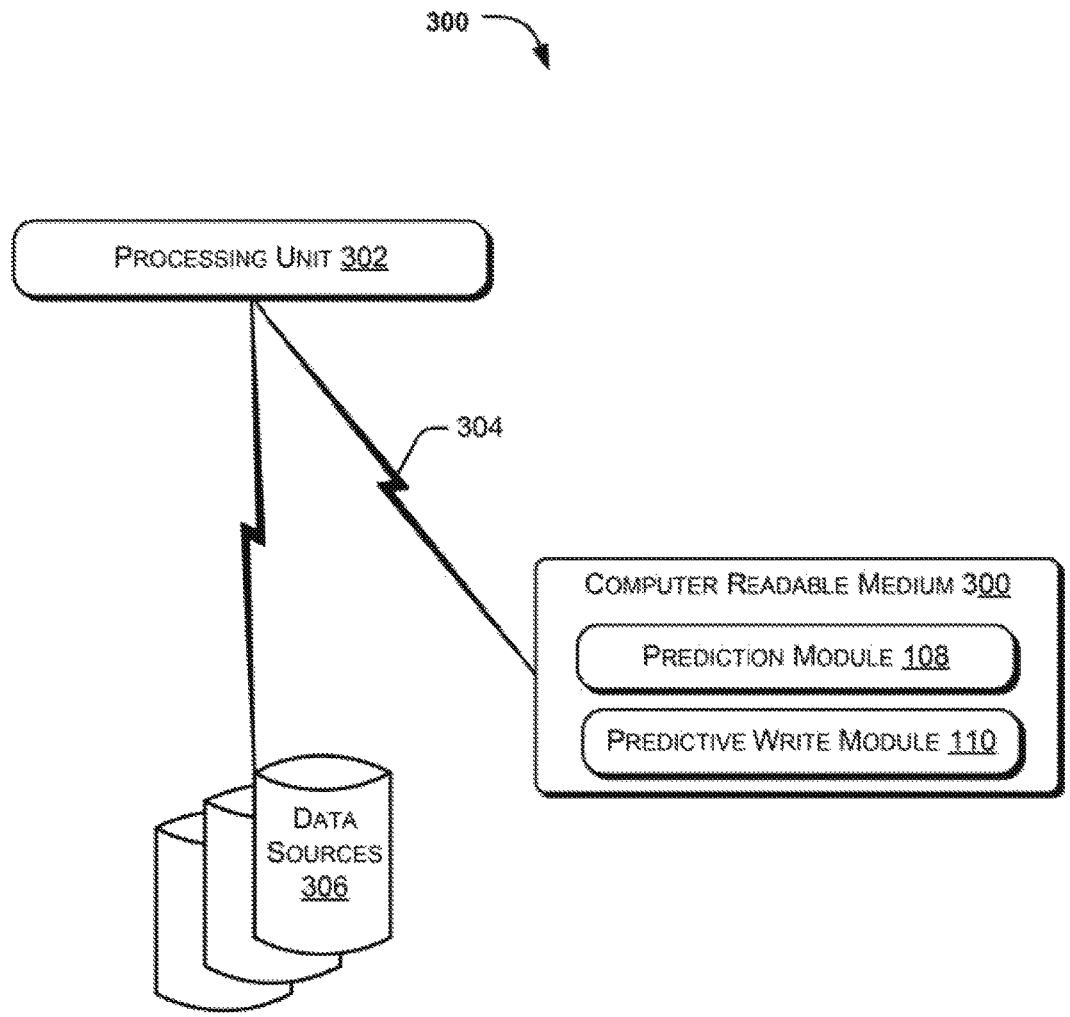
FIG. 3 illustrates an example computer readable medium storing instructions for performing a write operation on a main memory.

FIG. 3 illustrates an example computer readable medium 300 storing instructions for writing data on a main memory. In an example, the computer readable medium 300 is communicatively coupled to a processing unit 302 over a communication link 304.

For example, the processing unit 302 can be a computing customer device, such as a server, a laptop, a desktop, a mobile customer device, and the like. The computer readable medium 300 can be, for example, an internal memory customer device or an external memory customer device, or any non-transitory computer readable medium. In an example, the communication link 304 may be a direct communication link, such as any memory read/write interface. In another example, the communication link 304 may be an indirect communication link, such as a network interface. In such a case, the processing unit 302 can access the computer readable medium 300 through a network.

The processing unit 302 and the computer readable medium 300 may also be communicatively coupled to data sources 306 over the network. The data sources 308 can include, for example, databases and computing customer devices.

In an example, the computer readable medium 300 includes a set of computer readable instructions, such as a prediction module 104 and a predictive write module 106. The set of computer readable instructions can be accessed by the processing unit 302 through the communication link 304 and subsequently executed to perform acts for performing write operations on main memory.

On execution by the processing unit 302, the prediction module 108 may predict the last write in a dirty cache line. The prediction module 108 may first identify the dirty cache line in the LLC 160 of the cache memory 152. The dirty cache line may be understood as a cache line on which at least one write is performed. Thereafter, the prediction module 108 may use a last write predictor (LWP) to predict whether a write operation is a last write for the dirty cache line. The predicted last write indicates that the dirty cache line will not be written again before the dirty cache line Is evicted from the cache memory 152. Further, the predicted last write refers to a predicted pattern of the dirty cache line. The dirty cache line for which the last write is predicted is referred to as a last write cache line.

Thereafter, the predictive write module 110 may compare the predicted pattern with a pattern of the original data bits of the main memory 154. Accordingly, the predictive write module 110 may determine an operation to be performed on the original data bits on the man memory 154, such as the NVM. Further, the predictive write module 110 may associate a flag with the last write cache line to indicate that an optimization operation is associated with the last write cache line. For example, the operation may be a pre-WRITE operation, a pre-SET operation, and a pre-RESET operation. The predictive write module 110 determines the operation by analyzing the changes identified based on the comparison.

Although example implementations for performing a write operation on a main memory have been described in language specific to structural features and/or methods, it is to be understood that the appended claims are not necessarily limited to the specific features or methods described. Rather, the specific features and methods are disclosed as examples of systems and methods for performing a write operation on a main memory.

We claim:

1. A method for performing a operation on a main memory, the method comprising:
   predicting a last write in a fast write cache line, wherein the predicted last write indicates a predicted pattern of the last write cache line before the last write cache line is evicted from a cache memory;
   comparing the predicted pattern with a pattern of original data bits stored in the main memory for identifying changes to be made in the original data bits; and
   based on the comparison, determining an optimization operation to be performed on the original data bits, wherein the optimization operation modifies the original data bits based on the predicted pattern before the last write cache line is evicted from the cache memory.

2. The method as claimed in claim 1, the determining includes analyzing the predicted pattern of the last write cache line to select the optimization operation to be performed on the original data bits.

3. The method as claimed in claim 1, wherein the optimization operation includes one of a pre-SET operation, a pre-RESET operation, and a pre-WRITE operation.

4. The method as claimed in claim 3, wherein the pre-RESET operation includes performing a RESET operation on the original data bits before the last write cache line is written to the main memory.

5. The method as claimed in claim 1 further comprising associating a flag with the last write cache line to indicate the optimization operation scheduled to be performed on the original data bits corresponding to the last write cache line.

6. The method as claimed in claim 1 further comprising determining whether the predicted pattern is different from an actual pattern of the last write cache line, wherein based on the determination, the optimization operation performed on the original data bits is modified and the actual pattern of the last write cache line is written to the main memory.

7. The method as claimed in claim 1 further comprising ascertaining whether the optimization operation is pending at the time the last write cache line it evicted from the cache memory.

8. The method as claimed in claim 1 further comprising, determining at least one frequently accessed region of the main memory; and based on the determination, defining an optimization operation for writing on the at least one frequently accessed region of the main memory.

9. A computing system comprising:
a processor;
a write optimizer, coupled to the processor, for performing a write operation to a main memory, the write optimizer comprising,
a prediction module to:
identify a dirty cache line, wherein the dirty cache line indicates at least one write to a cache line; and
predict a last write for the dirty cache line, wherein the last write indicates a last written pattern of the dirty cache line before the dirty cache line is evicted from a cache memory; add
a predictive write module to:
compare the predicted pattern of a last write cache line with a pattern of original data bits on a main memory, wherein based on the comparison, an optimization operation is selected to be performed on the original data bits before the last write cache line is evicted from the cache memory; and
associate a flag with the last write cache line to indicate that an optimization operation is scheduled to be performed on the original data bits corresponding to the last write cache line.

10. The computing system as claimed in claim 9, wherein the write optimizer further comprises a write commit module to determine whether the predicted pattern is different from an actual pattern of the last write cache line, wherein based on the determination, the predicted pattern of the last write cache line is modified in the main memory to write the actual pattern.

11. The computing system as claimed in claim 10, wherein the write commit module further ascertains whether the optimization operation, as indicated in the flag is completed before eviction of the last write cache line.

12. The computing system as claimed in claim 9, wherein the optimization operation includes a partial pre-WRITE operation on the original data bits of the main memory.

13. The computing system as claimed in claim 9, wherein the predictive write module further identifies at least one frequently accessed region on the main memory.

14. A non-transitory computer-readable medium having a set of computer readable instructions that, when executed, cause a computing system to:
receive a last write prediction for a last write cache line, wherein the last write prediction indicates a predicted pattern of the last write cache line before the last write cache line is evicted from a cache memory;
compare the predicted pattern with an actual pattern of the last write cache line;
based on the comparison, identify an optimization operation to be performed an original data bits before the last write cache line is written to a main memory; and
associate a flag with the last write cache line to indicate that an optimization operation is scheduled to be performed on the original data bits corresponding to the last write cache line.

15. The non-transitory computer-readable medium having a set of computer readable instructions that, when executed, further cause the computing system to identify at least one frequently accessed region on the main memory.

* * * * *